United States Patent
Guilbert et al.

(10) Patent No.: US 9,611,863 B2
(45) Date of Patent: Apr. 4, 2017

(54) TURBINE ENGINE CASING

(71) Applicant: SNECMA, Paris (FR)

(72) Inventors: Virginie Guilbert, Moissy Cramayel (FR); Romain Plante, Moissy Cramayel (FR); Florent Rognin, Moissy Cramayel (FR)

(73) Assignee: SNECMA, Paris (FR)

( * ) Notice: Subject to any disclaimer, the term of this patent is extended or adjusted under 35 U.S.C. 154(b) by 400 days.

(21) Appl. No.: 14/261,653

(22) Filed: Apr. 25, 2014

(65) Prior Publication Data

US 2014/0321999 A1 Oct. 30, 2014

(30) Foreign Application Priority Data

Apr. 26, 2013 (FR) ...................................... 13 53875

(51) Int. Cl.
*F01D 5/00* (2006.01)
*F04D 29/40* (2006.01)
(Continued)

(52) U.S. Cl.
CPC .............. *F04D 29/40* (2013.01); *F02C 7/045* (2013.01); *B64D 2033/0206* (2013.01);
(Continued)

(58) Field of Classification Search
CPC ............. F05D 2230/64; F05D 2260/30; F05D 2260/31; B64D 2033/0206; F02C 7/045;
(Continued)

(56) References Cited

U.S. PATENT DOCUMENTS 4,235,303 A * 11/1980 Dhoore .................. B64D 33/02
181/214
5,609,313 A * 3/1997 Cole ...................... B64D 29/00
244/54
(Continued)

FOREIGN PATENT DOCUMENTS

| FR | 2 963 469 A1 | 2/2012 |
| FR | 2 976 974 A1 | 12/2012 |
| GB | 2 274 490 | 7/1994 |

OTHER PUBLICATIONS

French Preliminary Search Report issued Jan. 23, 2014 in FR Application 13 53875, filed on Apr. 26, 2013 ( with English Translation of Categories of Cited Documents).
U.S. Appl. No. 14/440,388, filed May 4, 2015, Plante, et al.

*Primary Examiner* — Jesse Bogue
(74) *Attorney, Agent, or Firm* — Oblon, McClelland, Maier & Neustadt, L.L.P.

(57) ABSTRACT

A turbine engine casing, including a substantially cylindrical wall and a single-piece annular panel for acoustic insulation mounted radially inside the wall, is provided. The panel includes a radially outer annular surface fitted with upstream and downstream first projecting members respectively arranged in the upstream and downstream portions of the radially outer annular surface of the panel. The wall includes a radially inner annular surface fitted with upstream and downstream second projecting members that are releasably fastened respectively to the upstream and downstream first projecting members.

10 Claims, 5 Drawing Sheets

(51) Int. Cl.
   *F02C 7/045*   (2006.01)
   *B64D 33/02*   (2006.01)

(52) U.S. Cl.
   CPC ...... *F05D 2230/64* (2013.01); *F05D 2260/30* (2013.01); *F05D 2260/31* (2013.01); *Y02T 50/672* (2013.01)

(58) Field of Classification Search
   CPC .......... F04D 29/40; Y02T 50/672; F02K 1/80; F02K 1/82
   See application file for complete search history.

(56) References Cited

U.S. PATENT DOCUMENTS

| | | | | |
|---|---|---|---|---|
| 6,279,313 | B1* | 8/2001 | Lawen, Jr. | F23R 3/60 60/752 |
| 7,338,244 | B2* | 3/2008 | Glessner | F16B 5/0208 411/349 |
| 8,104,290 | B2* | 1/2012 | Ellis | F16F 1/025 267/158 |
| 9,016,042 | B2* | 4/2015 | Chiou | F02K 1/60 137/15.1 |
| 2001/0035003 | A1 | 11/2001 | Sinha et al. | |
| 2007/0158527 | A1* | 7/2007 | Farah | F02K 1/002 248/610 |
| 2008/0022689 | A1* | 1/2008 | Farah | F01D 25/30 60/770 |
| 2008/0206044 | A1* | 8/2008 | Porte | B64D 33/02 415/119 |
| 2010/0084507 | A1* | 4/2010 | Vauchel | B64D 29/08 244/1 N |
| 2010/0252689 | A1* | 10/2010 | Vauchel | B64D 29/06 244/53 B |
| 2010/0314501 | A1* | 12/2010 | Vauchel | B64D 29/06 244/53 B |
| 2013/0034437 | A1* | 2/2013 | Porte | B64D 33/02 415/213.1 |
| 2013/0133977 | A1* | 5/2013 | Hurlin | B64D 33/02 181/288 |
| 2013/0227952 | A1* | 9/2013 | Grip | B64C 1/12 60/770 |
| 2014/0047849 | A1* | 2/2014 | Kramer | F02K 1/80 60/796 |
| 2014/0069106 | A1* | 3/2014 | Preston, III | F02K 1/822 60/796 |
| 2014/0090399 | A1* | 4/2014 | McAlice | F02K 1/82 60/796 |
| 2014/0123678 | A1* | 5/2014 | Preston, III | F23R 3/60 60/800 |
| 2014/0212273 | A1* | 7/2014 | Le Borgne | F01D 21/045 415/119 |
| 2015/0267555 | A1* | 9/2015 | Plante | B64D 29/06 415/119 |

\* cited by examiner

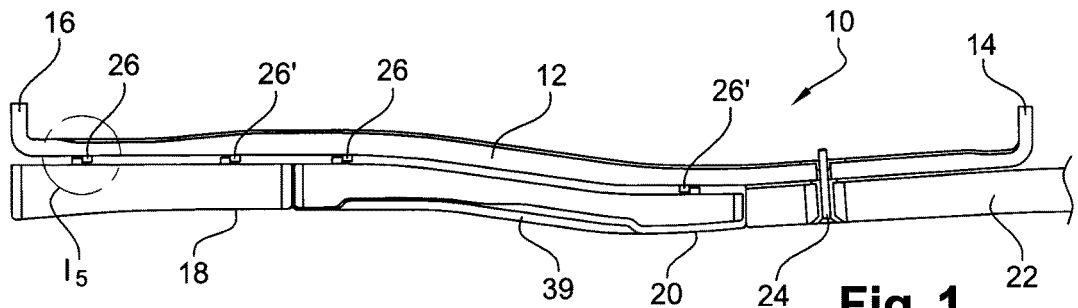
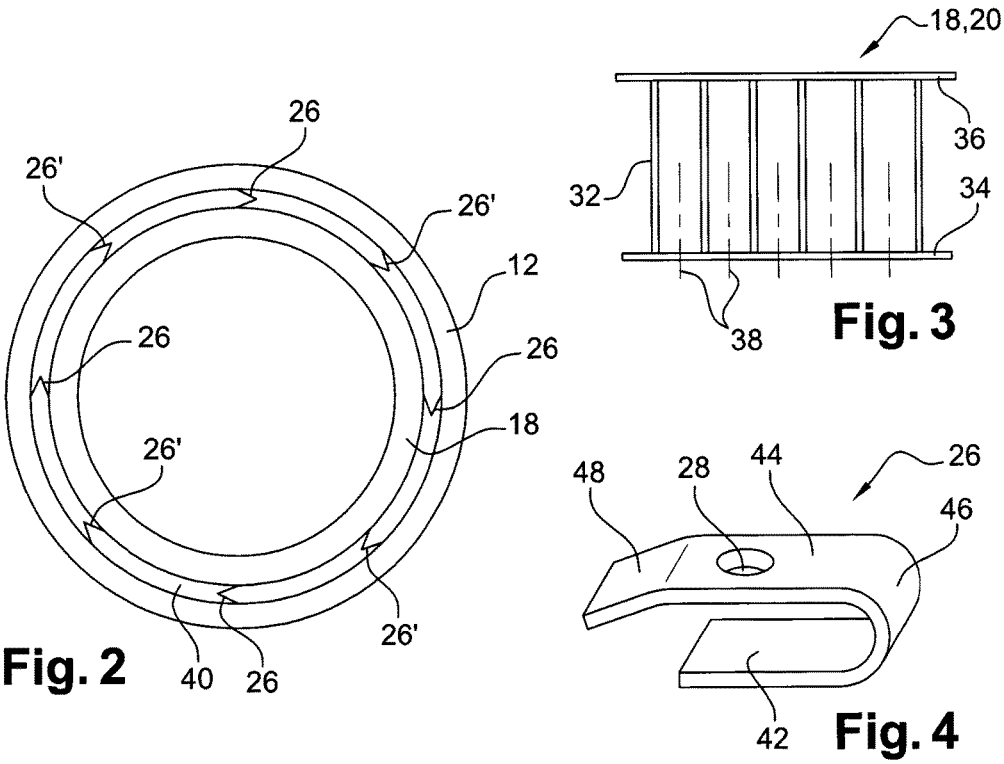
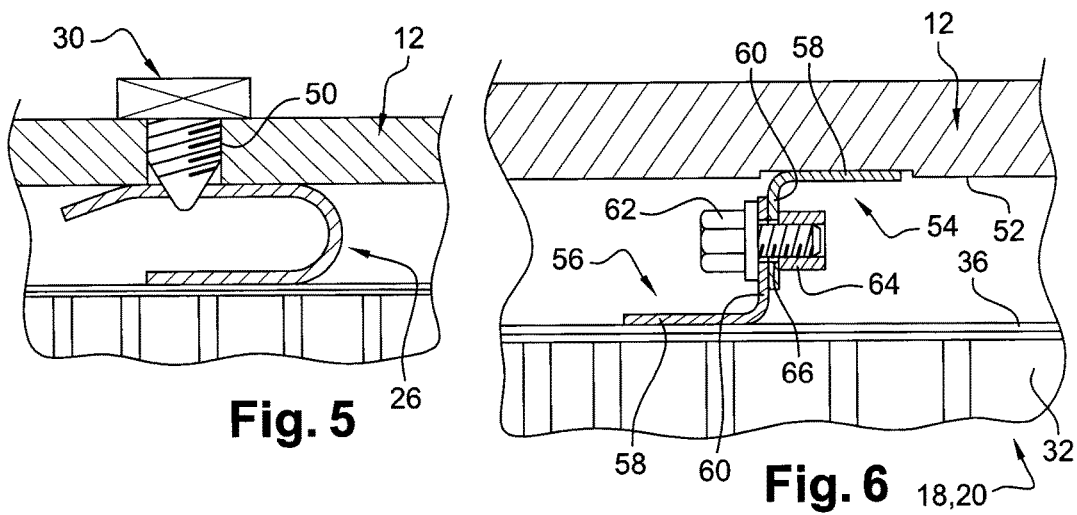

TURBINE ENGINE CASING

BACKGROUND OF THE INVENTION

Field of the Invention

The present invention relates to a turbine engine casing, in particular for a turbine engine such as an airplane turboprop or turbojet.

Description of the Related Art

A fan casing typically comprises a substantially cylindrical wall that extends around the fan blades of the turbine engine and that has an inside surface covered in acoustic insulation panels. In general, these panels comprise an annular honeycomb structure with inside and outside faces that are each covered in a skin that may be multiply perforated in order to improve the treatment of sound. They are for absorbing the soundwaves that are generated by the fan of the turbine engine.

The following prior applications in the name of the Applicant EP 2 318 679, EP 2 088 290, and FR 2 965 859, describe acoustic insulation panels of that type.

An acoustic insulation panel of a turbine engine is generally sectorized, i.e. made up of a plurality of panel sectors arranged circumferentially end to end and secured to the wall of the casing by adhesive or by fastener screws that extend radially relative to the longitudinal axis of the turbine engine. Fastening sectors by means of screws presents drawbacks since a large number of fastener screws need to be used, thereby firstly increasing the weight of the turbine engine, and secondly running the risk of damaging the fan blades in the event of loss or breakage. Furthermore, the interface zones of greater or smaller width between the sectors give rise to an alternation of smooth zones and of treated zones in the vicinity of the fan (thereby creating discontinuities in acoustic impedance), leading to an increase in the noise levels from the turbine engine at certain operating speeds. Furthermore, mounting numerous fastener screws to the panels requires them to be provided with densified zones, thereby degrading acoustic efficiency.

In order to limit the number of fastener screws, proposals are made in patent application FR 2 935 017 to lengthen the fan casing and to fasten a single-piece annular panel for acoustic insulation to the wall of the casing and to the air inlet sleeve. In practice, such an acoustic panel is difficult to maintain, given that it is necessary to take the turbine engine out of service in order to replace a damaged panel with a new panel.

Furthermore, a casing wall may present deformations and may have an inside surface that is not accurately cylindrical. This applies in particular to a casing wall made of composite material that, because of the way in which it is fabricated, can present dimensional tolerances that are relatively large. In the prior art, the acoustic panels that are fastened to a casing wall of that type do not enable the above-mentioned tolerances to be compensated.

That applies in particular to acoustic insulation panels that are adhesively bonded to the wall of the casing by means of a thermosetting adhesive. Such adhesive bonding takes a long time to achieve (several hours in an autoclave of large dimensions) and, in the event of the panel being damaged, it is necessary to remove the engine in order to replace the panel.

In order to remedy that drawback, patent application FR 12/60493 in the name of the Applicant proposes a turbine engine casing having a substantially cylindrical wall and a single-piece annular panel for acoustic insulation mounted inside the wall. Elastically deformable tabs are fastened to the panel, or respectively to the wall, and they include orifices for receiving the ends of screws fastened to the casing, or respectively to the panel.

Such a casing thus has a fastener system enabling the panel to be removed easily, in particular under the wing of an airplane, i.e. without removing the engine.

Given the resilience of the tabs, it is nevertheless difficult to ensure that the panel is accurately positioned inside the wall. Such tabs may also deform or crack under the effect of the mechanical or thermal stresses that are applied to them in operation.

Patent application FR 12/60495 in the name of the Applicant discloses a turbine engine casing comprising a substantially cylindrical wall and a single-piece annular panel for acoustic insulation mounted radially inside the wall, the panel including a radially outer annular surface fitted with upstream and downstream first projecting members respectively arranged in the upstream and downstream portions of the radially outer annular surface of the panel, the wall including a radially inner annular surface fitted with upstream and downstream second projecting members that are releasably fastened respectively to the upstream and downstream first projecting members. By way of example, the projecting members are formed by tabs fastened to the panel and to the wall of the casing, and the releasable fastening is provided by nut-and-bolt systems.

Such a method of fastening the single-piece panel to the wall of the casing is statically indeterminate and does not enable the panel to be positioned or centered accurately inside of the wall of the casing. Specifically, under such circumstances, positioning or centering is provided by the above-mentioned bolts engaged with clearance in the corresponding holes of the projecting members.

BRIEF SUMMARY OF THE INVENTION

A particular object of the invention is to provide a solution to these problems that is simple, effective, and inexpensive.

For this purpose, the invention proposes a turbine engine casing comprising a substantially cylindrical wall extending along a longitudinal axis, and a single-piece annular panel for acoustic insulation mounted radially inside the wall and substantially coaxially relative to the wall, the panel including a radially outer annular surface fitted with upstream and downstream first projecting members respectively arranged in the upstream and downstream portions of the radially outer annular surface of the panel, the wall including a radially inner annular surface fitted with upstream and downstream second projecting members that are releasably fastened respectively to the upstream and downstream first projecting members, the casing being characterized in that each of the upstream or downstream first projecting members, or each of the upstream or downstream second projecting members comprises a first portion fastened to the wall or to the panel and a second portion fastened to the corresponding opposite projecting member, the first portion being slidable relative to the second portion along the axis of the panel and of the wall.

Because the panel is in the form of a single annular piece (also known as a one piece barrel (OPB)), there is no acoustic impedance discontinuity over its entire surface. Furthermore, the above-mentioned members do not significantly increase the weight of the casing and they do not pass all the way through the radial thickness of the panel. They therefore do not give rise to discontinuities of acoustic insulation.

Furthermore, as described in greater detail below, the invention makes the panel easy to install and it enables the panel to be removed, in particular under the wing of an airplane fitted with the turbine engine (i.e. without removing the engine).

Since the projecting members deform little and are relatively insensitive to the various mechanical and thermal stresses that are applied to them in operation, the positioning of the panel inside the wall of the casing is improved.

Finally, the above-mentioned sliding of the two portions serves to reduce or avoid the connection between the panel and the wall of the casing being statically indeterminate.

According to a characteristic of the invention, each projecting member includes a radially extending portion coming to bear against the radial portion of the opposite projecting member, said radial portions of the opposite projecting members being fastened to each other in releasable manner.

The radial portions thus form abutments for axially positioning the panel relative to the wall.

Preferably, the opposite projecting members are fastened together by nut-and-bolt assemblies, each nut-and-bolt assembly comprising a bolt and a floating nut crimped to one of the radial portions of the opposite projecting members.

The presence of floating nuts serves to reduce the statically indeterminate nature of such an assembly.

According to another characteristic of the invention, the first projecting members are received at least in part in setbacks of the panel.

Advantageously, each of at least two projecting members includes a centering peg for engaging in a calibrated hole of the opposite projecting member.

In this way, the centering and the positioning of the panel inside the wall of the casing are performed not by the bolts, as happens in the prior art, but by the centering pegs. The quality of such centering or positioning is thus greatly improved.

These pegs enable the panel to be positioned radially and angularly inside the wall of the casing, the above-mentioned radial portions then providing the axial positioning of said panel relative to said wall of the casing.

Under such circumstances, the upstream first projecting members or the upstream second projecting members may comprise two portions that are slidable relative to each other, at least two downstream first projecting members or at least two downstream second projecting members each including a centering peg, or vice versa.

In other words, the pairs of opposite members fitted with sliding means, and formed by said first and second portions, are not the same as the pairs of opposite members fitted with centering pegs.

In an embodiment of the invention, the first portion includes a base fastened to the panel or to the wall, with two side branches projecting therefrom, two opposite rims extending towards each other from the ends of the branches that are remote from the base, the second portion being formed by an axial portion slidably engaged in the space defined between the base, the side branches, and the rims of the first portion.

Furthermore, the upstream projecting members and the downstream projecting members may be offset angularly from one another.

Such an offset shows clearly that the projecting members are properly positioned relative to one another, e.g. when looking from upstream, in particular when installing the panel inside of the wall of the casing.

The invention also provides a turbine engine, such as an airplane turboprop or turbojet including a casing of the above-specified type.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawings, in which:

FIG. 1 is a diagrammatic half-view in longitudinal section of a fan casing of a prior art turbine engine;

FIG. 2 is a front view of the FIG. 1 casing seen from upstream;

FIG. 3 is a fragmentary diagrammatic half-view in axial section of an acoustic insulation panel;

FIG. 4 is a diagrammatic view in perspective of a flexible tab for a prior art casing;

FIG. 5 is a view on a larger scale of a detail $I_5$ of FIG. 1, and it shows means for fastening an acoustic insulation panel;

FIG. 6 is a view corresponding to FIG. 5, showing another prior art embodiment;

DETAILED DESCRIPTION OF THE INVENTION

Figure 7:
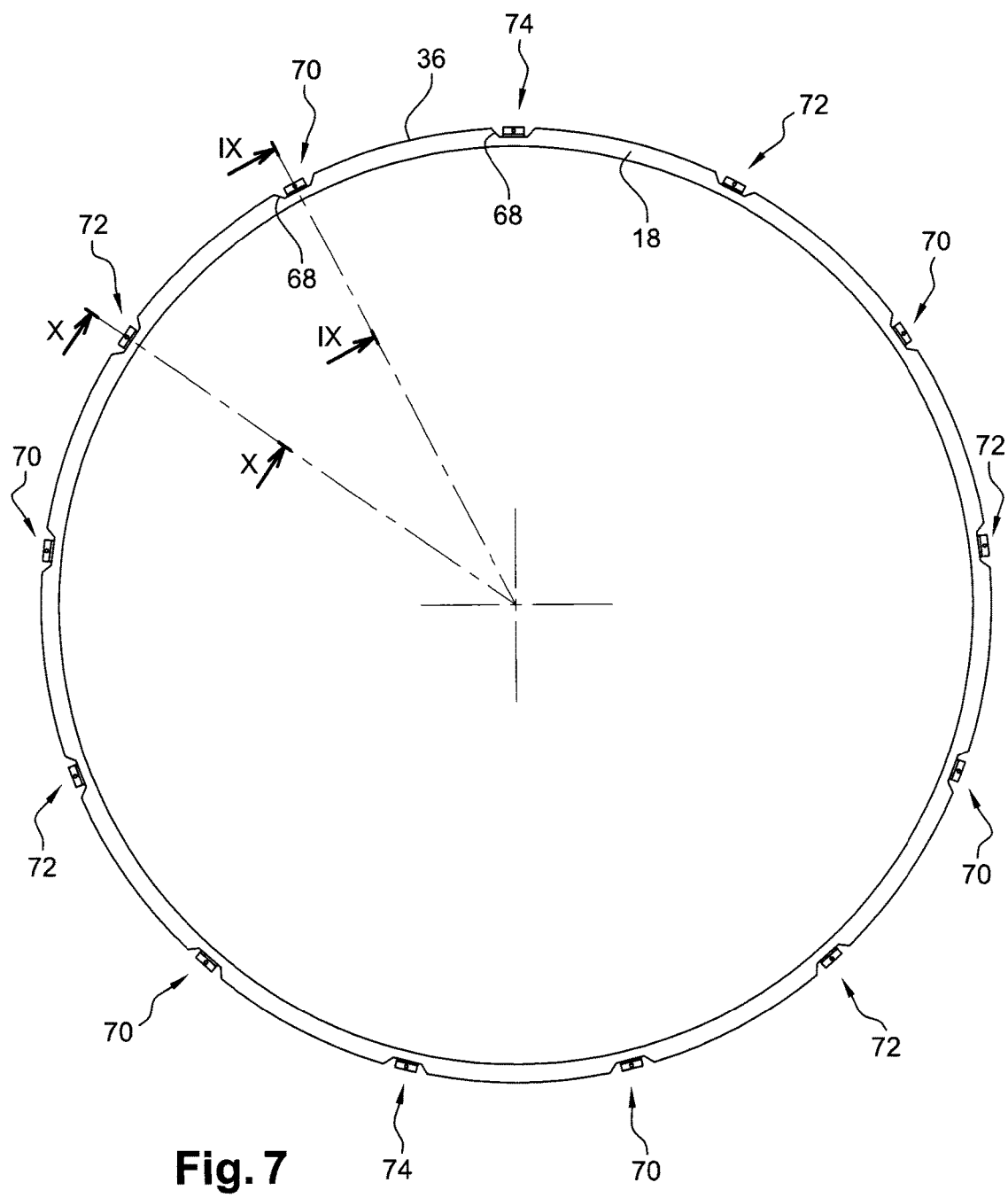
FIG. 7 is a view from upstream of the single-piece panel of the invention.
Figure 8:
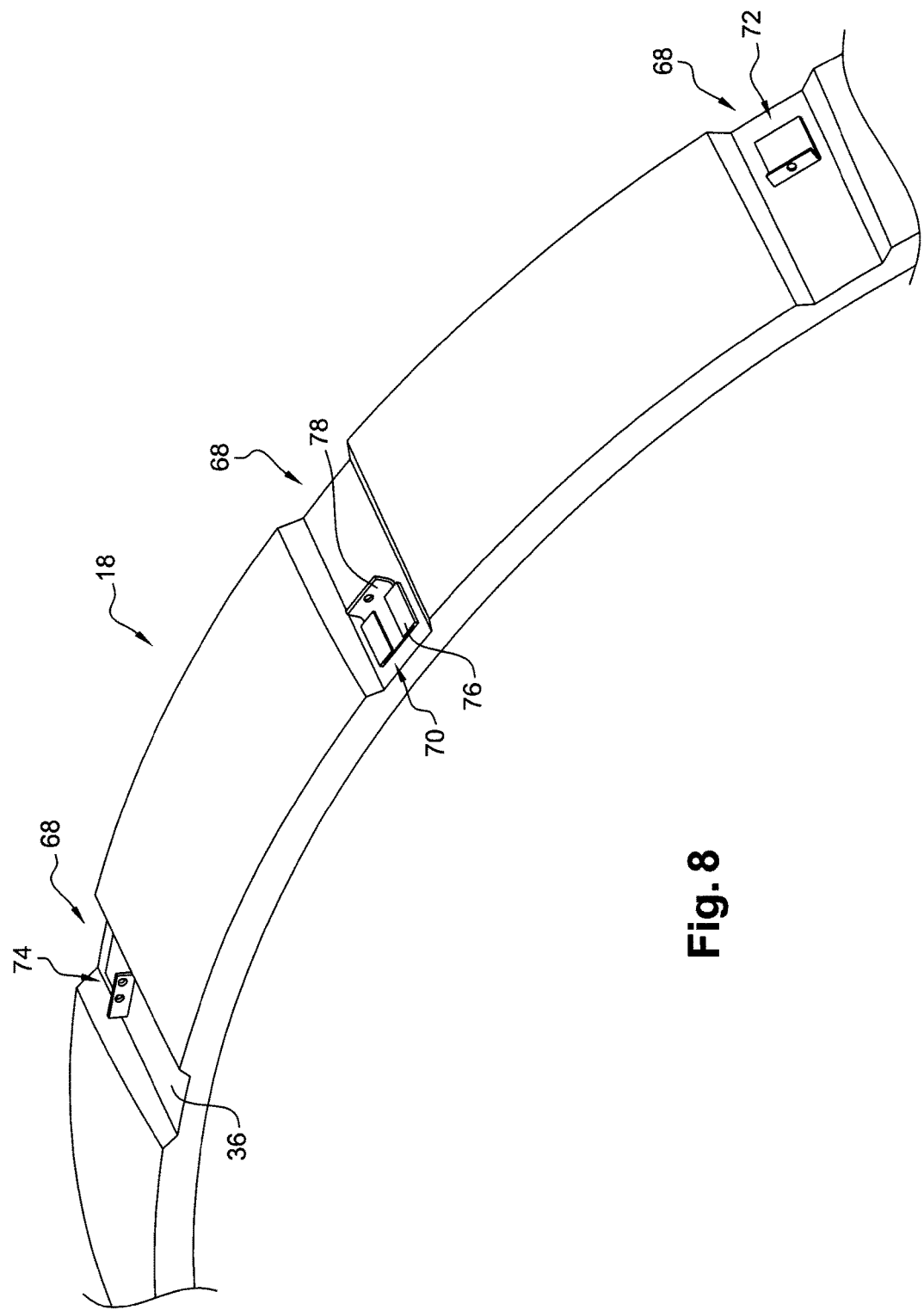
FIG. 8 is a perspective view of a portion of the FIG. 7 panel.
Figure 9:
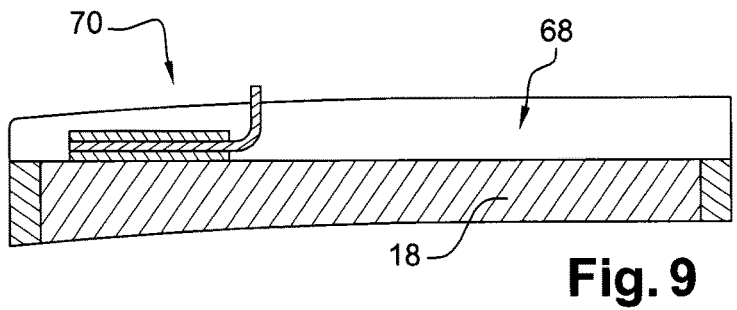
FIGS. 9 and 10 are half-views in section of the panel, respectively on lines IX-IX and X-X of FIG. 7.
Figure 10:
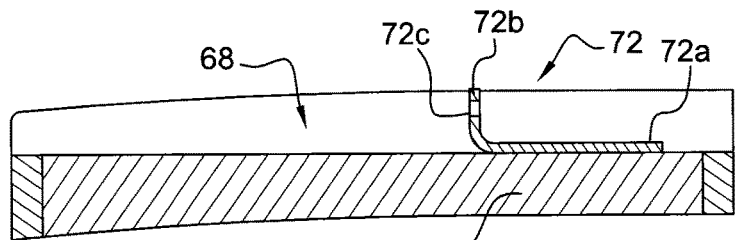

A prior art turbine engine casing is shown in FIGS. 1 to 5. Such a casing, as disclosed in patent application FR 12/60493, forms a portion of a nacelle surrounding a turbine engine and having a fan rotating inside it to generate a secondary air stream that flows from upstream to downstream between the nacelle and the engine and that delivers a portion of the thrust produced by the turbine engine.

As can be seen in FIG. 1, the casing 10 comprises a substantially cylindrical wall 12 extending along a longitudinal axis and including annular fastener flanges 14 and 16 at its longitudinal ends. The downstream flange 14 is fastened by nut-and-bolt type means to a flange (not shown) of an intermediate casing, and the upstream flange 16 is fastened by nut-and-bolt type means to a flange (not shown) of a sleeve for admitting air into the nacelle.

The casing has annular acoustic insulation panels 18, 20, and 22 that cover the inside cylindrical surface of the wall 12 and that are fastened to said wall.

In the example shown, the wall 12 has three annular panels 18, 20, and 22, namely two single-piece panels 18 and 20, respectively an upstream panel and a middle panel, and also a downstream panel 22 that is sectorized.

The downstream panel 22 has panel sectors that are arranged circumferentially end-to-end and that are fastened to the wall 12 by bolts 24 passing radially through the sectors and engaged in orifices of the wall 12.

The annular panels 18 and 20 are single pieces (i.e. they are not sectorized) and they are fastened to the wall 12 by technology that enables the panels to be removed, in particular under the wing of an airplane during a maintenance operation.

In the example shown in FIGS. 1 to 5, the panels 18 and 20 are mounted inside of the wall 12 by resilient snap fastening, each panel having elastically deformable tabs 26 that include orifices 28 for receiving screws 30 projecting from the radially inner surface of the wall.

FIG. 3 shows an embodiment of a single-piece panel 18, 20, this panel having an annular honeycomb structure 32 with inside and outside faces covered by respective laminated skins 34 and 36, the inside skin 34 including multiple perforations 38. The panel may also include a layer of abradable material, in particular in the zone of the panels surrounding the fan blades, as applies to the panel 20 that includes within its inside skin 34 an inner layer 39 of abradable material (FIG. 1).

As can be seen in FIG. 2, each panel 18 or 20 is formed as a single piece without discontinuity, the tabs 26 being fastened to the outside skin 36 of a panel and being situated in an annular space 40 extending between the panel 18 or 20 and the wall 12.

FIG. 4 is a diagrammatic perspective view of an elastically deformable tab 26.

In the example shown, the tab is C-shaped and comprises two plane portions 42 and 44, respectively an inner portion and an outer portion, which portions are connected together by a curved junction portion 46.

The inner portion 42 is pressed against the outside skin 36 of the panel 18 or 20 (FIG. 5) and is fastened thereto by adhesive or by welding, and the outer portion 44 includes an orifice 28 of frustoconical shape that is to be engaged on the radially inner end of a screw 30 fastened to the wall 12, the screw having a conical tip.

The portion 44 of the tab 26 is of a length greater than the length of the portion 42, and the free end portion 48 of this portion 44, remote from the junction portion 46 and extending beyond the portion 42, is folded radially inwards, i.e. towards the opposite portion 42.

As can be seen in FIGS. 1 and 2, each panel may be fitted with two annular rows of tabs, an upstream row of tabs 26 and a downstream row of tabs 26'. The tabs in each row are regularly distributed around the longitudinal axis of the casing and they are diametrically opposite in pairs. The tabs of the upstream row are also angularly offset from the tabs of the downstream row about the longitudinal axis of the casing (FIG. 2). By way of example, each row comprises twelve tabs.

The screw 30 shown in FIG. 5 is engaged in and screwed into radial tapping 50 in the wall 12. The end portion of the screw 30 is substantially frustoconical in shape, the above-mentioned orifice 28 in the tab being of a shape that is substantially complementary to this end portion so as to facilitate mutual engagement on assembly.

In the engaged position shown in FIG. 5, the tab 26 is stressed radially between the panel 18 or 20 and the screw 30.

The above-described panels 18 and 20 may be assembled inside the wall 12 of the casing as follows.

The panels 18 and 20 are arranged upstream from the wall 12, on the same axis, and each of them is then moved in axial translation downstream until it is received inside the wall.

When the openings in the C-shaped tabs 26 are oriented axially downstream, a panel is arranged angularly in such a manner that the tabs are in axial alignment with the corresponding screws 30 of the wall before being moved in translation as specified above, so that on moving in translation in this way the tabs 26 co-operate with the screws 30 by the resilient snap-fastening. The folded portions of the tabs 26 facilitate this operation since they form ramps pointing downstream over which the screws 30 can come to bear and slide during the above-mentioned movement in translation, until the screws engage in the orifices 28.

As mentioned above, given the resilience of the tabs 26, it is nevertheless difficult to ensure that the panel 18 or 20 is accurately positioned inside the wall 12. Such tabs 26 may also deform or crack under the effect of the mechanical or thermal stresses that are applied to them in operation.

FIG. 6 shows another prior art embodiment as disclosed in patent application FR 12/60495. In that embodiment, the inner surface 52 of the wall 12 of the casing 10 is fitted with upstream and downstream tabs 54. The outside skin 36 of a single-piece panel 18 or 20 is likewise fitted with upstream and downstream tabs 56 that are to be fastened to the corresponding tabs 54 of the wall 12 of the casing 10.

Each tab 54, 56 has a portion 58 that extends axially and that is fastened to the corresponding surface 52, 36 of the panel 18 or 20, or of the wall 12 of the casing 10, and another portion 60 that extends radially. Radial portions 60 of two opposite tabs 54 and 56 come to bear one against the other and they are fastened together by means of nut-and-bolt systems. Each system comprises a bolt 62 cooperating with a nut 64 crimped to the radial portion 60 of one of the opposite tabs 54 and 56, specifically the tab 54.

As mentioned above, fastening the single-piece panel 18 or 20 to the wall 12 of the casing 10 in this way is statically indeterminate and does not enable the panel 18 or 20 to be positioned or centered accurately inside of the wall 12 of the casing 10. Specifically, under such circumstances, the positioning or centering is provided by the above-mentioned bolts 62 engaging with clearance in holes 66 formed in the radial portions of the tabs 54, 56.

FIGS. 7 to 16 are shown a casing 10 in an embodiment of the invention seeking to remedy the above-mentioned drawbacks.

As before, the casing 10 has a substantially cylindrical wall 12 and a single-piece annular panel 18 for acoustic insulation mounted radially inside the wall 12.

The panel 18 presents a structure similar to that shown in FIG. 3 and also includes setbacks 68 extending axially over the entire length of the panel 18. The setbacks 68 are offset angularly or circumferentially relative to one another and they are distributed regularly all around the circumference of the panel 18. By way of example, the panel 18 has thirteen setbacks 68.

A projecting member 70, 72, or 74 is mounted in each of these setbacks. More particularly, the panel 18 is fitted with so-called "upstream" members 70, i.e. members situated in an upstream portion of the panel 18, and so-called "downstream" projecting members 72 and 74, i.e. situated in the downstream portion of the panel 18.

The upstream and downstream projecting members 70 and 72, 74 are distributed circumferentially, in alternation, and they are received at least in part in the setbacks 68. Since the number of setbacks 68 is odd in the example shown in figures, it is not possible for the alternation to be exact in this example. Thus, as can be seen in FIG. 7, the panel 18 has two downstream projecting members 72 and 74 that are circumferentially in succession.

Figure 11:
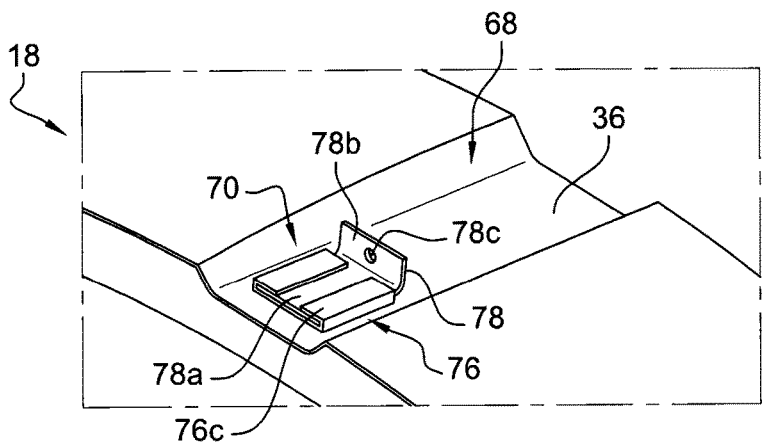
FIG. 11 is a perspective view of a portion of the panel fitted with an upstream projecting member constituted by two portions that are slidable relative to each other.
Figure 12:
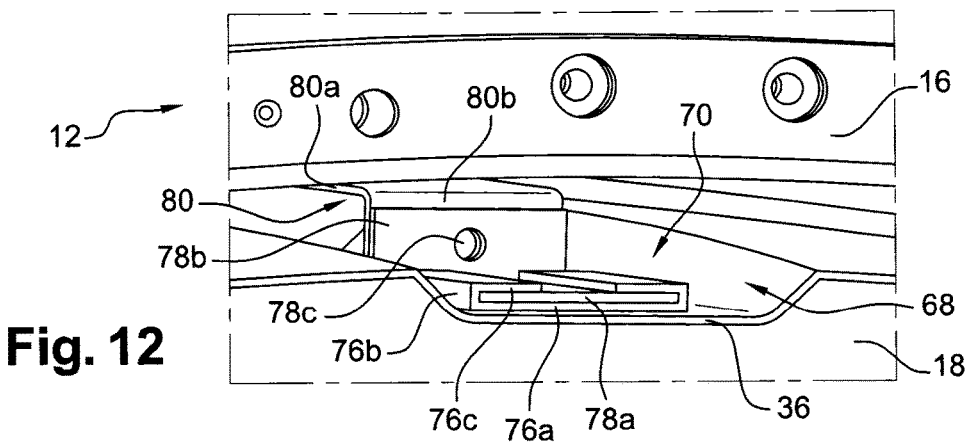
FIG. 12 is a perspective view showing the FIG. 11 portion mounted inside the wall of the casing.
Figure 13:
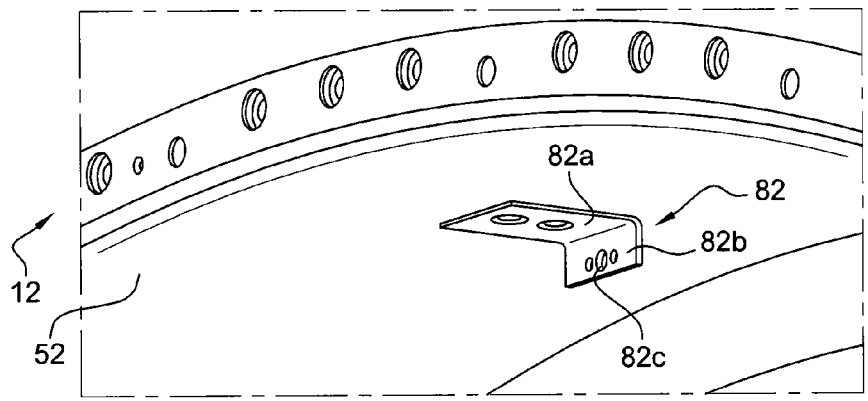
FIG. 13 is a perspective view of a portion of the wall of the casing, fitted with a member projecting downstream and without a centering peg.
Figure 14:
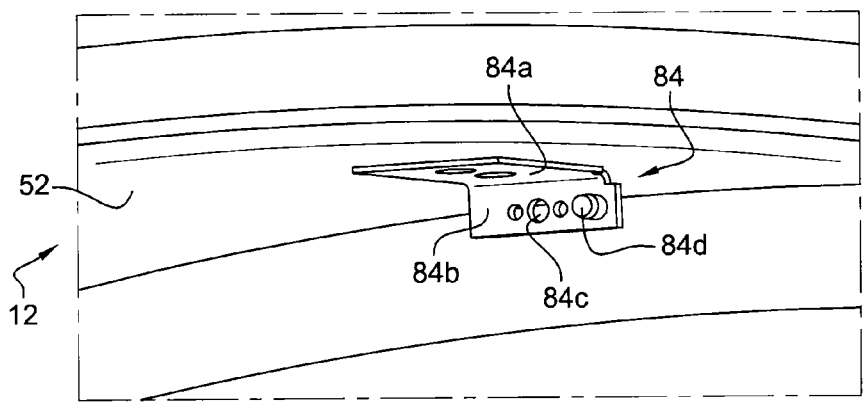
FIG. 14 is a perspective view of a portion of the wall of the casing, fitted with a member projecting downstream and including a centering peg.
Figure 15:
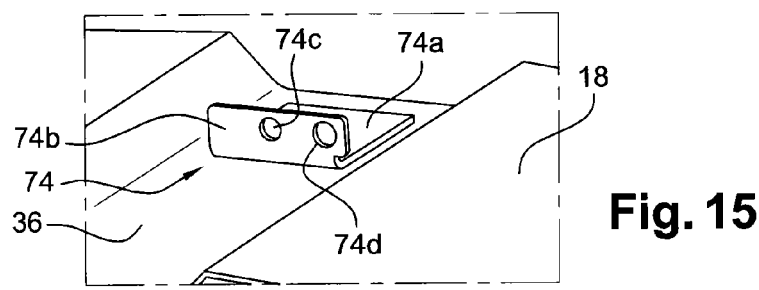
FIG. 15 is a perspective view of a portion of the wall of the panel fitted with a member projecting downstream and including a hole for passing a fastener screw and a centering hole.
Figure 16:
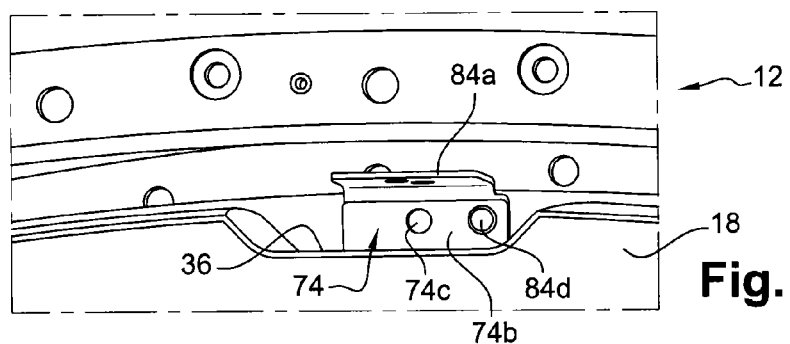
FIG. 16 is a perspective view of a portion of the casing, showing the FIG. 15 projecting member fastened to the FIG. 14 projecting member.

As can be seen better in FIGS. 11 and 12, each upstream projecting member 70 of the panel 18 has a first portion 76 fastened to the panel 18 and a second portion 78 that is slidable relative to the first portion 76 along the longitudinal axis of the setback 68 the purpose of being fastened to an upstream projecting member of the wall 12 of the casing 10.

The first portion 76 is formed by a section member leaving a section that comprises a base 76a fastened to the bottom wall of the setback 68, with two side branches 76b projecting therefrom and with the radially outer ends of the branches being extended by oppositely directed circumferential rims 76c that point towards each other.

The base 76a may be fastened by adhesive or by rivets to the bottom wall, i.e. to the outside skin 36 of the panel 18, or it may be incorporated, at least in part, in this laminated skin 36.

The second portion 78 is in the form of an angle tab having a portion 78a extending axially that is mounted to slide freely in the space formed between the above-mentioned base 76a, branches 76b, and rims 76c, and a portion 78b extending radially and including a hole 78c for passing a fastener screw.

Each downstream projecting member 72, 78 of the panel is formed by an angle tab having a portion 72a, 74a extending axially that is fastened by adhesive or by riveting to the bottom wall, i.e. the outside skin 36 of the panel 18, or that is indeed at least partially incorporated in this laminated skin 36. The upstream end of this portion 72a, 74a is extended by a radial portion 72b, 74b including a central hole 72c, 74c for passing a bolt fastener.

Two downstream projecting members 74 of the panel 18 also include respective calibrated centering holes 74d in their radial portions 74b (FIG. 15) for engaging a centering peg, as described more fully below. These two downstream projecting members 74 of the panel 18 are situated in almost diametrically opposite positions, as can be seen in FIG. 7.

Likewise, the radially inner surface 52 of the wall 12 of the casing 10 is fitted with projecting members, referred to respectively as upstream members 80 and a downstream members 82, 84, which members are fastened respectively to the upstream and downstream projecting members 70 and 72, 74 of the single-piece panel 18.

The upstream projecting members 80 of the wall 12 are in the form of angle tabs, each having an axial portion 80a fastened to the wall 12 of the casing 10, with its upstream end extended by a radial portion 80b that presses against the radial portion 78b of the upstream projecting member 70 of the panel 18 and that includes a central hole for passing a bolt (not shown).

An optionally floating nut is also fastened to the downstream surface of the radial portion 80b of the upstream member 80 of the wall 12 of the casing 10, e.g. by riveting. This nut is not visible in the figures, but its structure is well-known to the person skilled in the art. A floating nut makes it possible in particular to accommodate a small amount of misalignment between the axis of the bolt and the axis of the corresponding hole.

This nut co-operates with a screw, not shown, enabling the radial portion 78b of the upstream member 70 the panel 18 to be fastened to the radial portion 80b of the upstream member 80 of the wall 12 of the casing 10.

The downstream projecting members 82, 84 of the wall 12 of the casing 10 are likewise in the form of angle tabs, each having an axial portion 82a, 84a fastened to the wall 12 of the casing 10, with their upstream ends extended by respective radial portions 82b, 84b that press against the radial portions 72b, 74b of the corresponding downstream projecting members 72, 74 of the panel 18 and that include respective central holes 82c, 84c for passing bolts (not shown).

As before, the downstream faces of the radial portions 82b, 84b of the downstream projecting members 82, 84 of the wall 12 are fitted with respective optionally-floating nuts (not shown) that co-operate with respective bolts (not shown) serving to fasten together the radial portions 72b, 74b, 82b, 84b of opposing downstream projecting members 72, 74, 82, 84.

To downstream projecting members 84 of the wall 12 of the casing 10 have centering pegs 84d extending upstream from the corresponding radial portions 84b and engaged in the centering holes 74d of the radial portion 74b of the projecting members 74 of the panel 18.

The axial portions 80a, 82a, 84a of the upstream and downstream projecting members 80 and 82, 84 of the wall 12 of the casing 10 may be received, at least in part, in countersinks of depths that are adjusted in such a manner as to compensate for any departures of the wall 12 of the casing 10 from a cylindrical shape.

Also, these axial portions 80a, 82a, 84a may be fastened to the wall 12 of the casing 10 with the help of non-removable bolts, i.e. bolts that cannot be removed without being destroyed.

The single-piece panel 18 can thus be easily installed or removed from the upstream end of the wall 12 of the casing 10, in particular during a maintenance operation under the wing of an airplane.

The invention claimed is:

1. A turbine engine casing comprising:
a cylindrical wall extending along a longitudinal axis; and
a single-piece annular panel for acoustic insulation mounted radially inside the wall and extending along a longitudinal axis so as to be coaxial relative to the wall, the panel including a radially outer annular surface fitted with upstream and downstream first projecting members respectively arranged in upstream and downstream portions of the radially outer annular surface of the panel, the wall including a radially inner annular surface fitted with upstream and downstream second projecting members that are releasably fastened respectively to the upstream and downstream first projecting members,
wherein each of the upstream or downstream first projecting members, or the upstream or downstream second projecting members comprises a first portion fastened to the panel or to the wall, respectively, and a second portion fastened to the corresponding opposite projecting member, the first portion being slidable relative to the second portion along the longitudinal axis of the panel and the longitudinal axis of the wall when fastened.

2. A casing according to claim 1, wherein each projecting member includes a radially extending portion coming to bear against the radial portion of the opposite projecting member, said radial portions of the opposite projecting members being fastened to each other in releasable manner.

3. A casing according to claim 2, wherein the opposite projecting members are fastened together by a nut-and-bolt assemblies, each nut-and-bolt assembly comprising a bolt and a floating nut crimped to one of the radial portions of the opposite projecting members.

4. A casing according to claim 1, wherein the first projecting members are received at least in part in setbacks of the panel.

5. A casing according to claim 1, wherein each of at least two projecting members includes a centering peg for engaging in a calibrated hole of the opposite projecting member.

6. A casing according to claim 5, wherein the upstream first projecting members or the upstream second projecting members comprise two portions that are slidable relative to each other, at least two downstream first projecting members or at least two downstream second projecting members each including a centering peg, or the downstream first projecting members or the downstream second projecting members comprise two portions that are slidable relative to each other, and at least two upstream first projecting members or at least two downstream second projecting members each include a centering peg.

7. A casing according to claim 1, wherein the first portion includes a base fastened to the panel or to the wall, with two side branches projecting therefrom, two opposite rims extending towards each other from the ends of the branches that are remote from the base, the second portion being formed by an axial portion slidably engaged in the space defined between the base, the side branches, and the rims of the first portion.

8. A casing according to claim 1, wherein the upstream projecting members and the downstream projecting members are offset angularly from one another in a radial plane.

9. A turbine engine such as an airplane turboprop or turbojet including a casing according to claim 1.

10. A casing according to claim 7, wherein the axial portion of the second portion is planar, and the second portion includes a radial portion extending radially from a free end of the axial portion of the second portion.

* * * * *